(12) United States Patent
Dennis

(10) Patent No.: US 6,604,620 B2
(45) Date of Patent: Aug. 12, 2003

(54) KIT FOR ATTACHING A PORTABLE CONVEYOR TO AN ALL TERRAIN VEHICLE OR THE LIKE

(76) Inventor: Andrew Dennis, Box 26, Brookdale Manitoba (CA), R0K 0G0

( * ) Notice: Subject to any disclaimer, the term of this patent is extended or adjusted under 35 U.S.C. 154(b) by 27 days.

(21) Appl. No.: 10/044,077

(22) Filed: Jan. 11, 2002

(65) Prior Publication Data
US 2002/0125100 A1 Sep. 12, 2002

(51) Int. Cl.[7] ............................................... B65G 21/10
(52) U.S. Cl. ........................ 198/312; 198/313; 198/318
(58) Field of Search ................................. 198/312, 313, 198/314, 315, 318

(56) References Cited

U.S. PATENT DOCUMENTS

| | | | |
|---|---|---|---|
| 3,623,597 A | * 11/1971 | Asndt | 198/318 X |
| 3,638,782 A | * 2/1972 | Cotton et al. | 198/318 X |
| 4,503,803 A | * 3/1985 | Barnes | 198/318 X |
| 4,512,687 A | 4/1985 | Enns | |
| 4,526,265 A | 7/1985 | Enns | |
| 6,244,418 B1 | * 6/2001 | Desrochers | 198/318 X |

* cited by examiner

Primary Examiner—James R. Bidwell
(74) Attorney, Agent, or Firm—Adams Evans P.A.

(57) ABSTRACT

An apparatus in kit form for attachment of a conventional portable conveyor to a vehicle for transport comprises a rear hitch member attached to an axle mount on the axle of the conveyor adjacent one wheel and adapted at an opposite end thereof for releasable attachment to a vehicle's rear hitch. A front vehicle mount is attached to a front portion of the vehicle and a conveyor mount is attached to a support location between the intake end of the conveyor body and the axle. A front hitch member has an upper end releasably attached to the conveyor mount, and has a lower end releasably attachable to the front vehicle mount, so as to bear against the support location as the conveyor body moves down, with the result that the intake end moves up. The apparatus is adjustable such that the conveyor and vehicle may be substantially aligned for travel.

16 Claims, 3 Drawing Sheets

KIT FOR ATTACHING A PORTABLE CONVEYOR TO AN ALL TERRAIN VEHICLE OR THE LIKE

This invention is in the field of conveyors and in particular apparatus for transporting such conveyors short distances.

BACKGROUND

Portable auger and belt conveyors are commonly used on farms for conveying grains, fertilizer and the like. These portable conveyors generally comprise a conveyor body supported on an elevating frame where the frame is operable to move the conveyor body up and down in response to an actuator. The conveyor body and frame are supported on an axle with wheels such that the intake end of the conveyor body normally rests on the ground as the conveyor body pivots up and down raising and lowering the output end of the conveyor body The conveyors must be moved around the farmyard from bin to bin. Traditionally this was accomplished manually by picking up the intake end of the conveyor and pushing it into position, or by hooking the intake end to a towing vehicle for moving longer distances. When towed however, the final positioning generally requires the towing vehicle to be unhooked so that the intake end can be properly positioned. For example it is commonly required to move the intake end of auger conveyors through a bin door. With larger conveyors, the manual movement becomes more problematic. As well, the recent trend to hopper bottom bins requires that the intake end be moved under the center of the bin which can be difficult to accomplish as the sloping bin floor interferes with the operator as he maneuvers the intake end of the conveyor.

Various powered conveyor movers are available which utilize the engine of the conveyor to power the wheels, and may also provide for power raising and lowering of the intake end, and also the output end. These are quite costly and such a mover is required for each conveyor on the farm. Often a farm has three or more conveyors, each of which would ideally be provided with such a mover but for the cost.

Such conveyors in the prior art can also mounted to a vehicle for movement. Such a conveyor is disclosed in U.S. Pat. No. 4,714,149 to Tiede.

A tractor is removably attached to a conveyor in U.S. Pat. Nos. 4,512,687 and 4,526,265 to Enns. The tractor acts to move the conveyor along the ground, as well as to drive the conveyor for conveying material. Due to the size of the tractor, considerable modification is required to the conveyor, such that the set-up would be costly, and not practical to adapt to several existing conveyors for movement by a tractor.

All terrain vehicles are popular on farms for various chores, and are commonly used as a towing vehicle to move conveyors conventionally by attaching the intake end thereto. It would be beneficial to provide a kit that would allow a conventional conveyor to be quickly attached to and detached from an all terrain vehicle, or similar vehicle, and that would allow the intake end of the conveyor to be positioned by maneuvering the vehicle.

SUMMARY OF THE INVENTION

It is an object of the present invention to provide an apparatus for use with a conventional portable conveyor to allow quick attachment and release of a vehicle, such as an all terrain vehicle, so that the conveyor may be transported by the vehicle.

It is a further object of the present invention to provide such an apparatus wherein the vehicle is remote from the intake end such that the intake end of the conveyor can be positioned using the vehicle.

It is a further object of the present invention to provide such an apparatus that is economical to install and use on a plurality of conveyors.

The present invention provides in one aspect, for use with a conventional portable conveyor comprising a conveyor body supported on an elevating frame, the frame operable to move the conveyor body up and down, the conveyor body and frame supported on an axle with wheels such that an intake end of the conveyor body normally rests on the ground as the conveyor body pivots up and down about the intake end thereof, an apparatus in kit form for attachment of the conveyor to a vehicle. The apparatus comprises an axle mount adapted for attachment to the axle of the conveyor adjacent a wheel thereof. A rear hitch member has an axle end releasably and pivotally attachable to the axle mount and is adapted at an opposite tow end thereof for releasable attachment to a vehicle hitch at a rear end of the vehicle. A front vehicle mount is adapted for attachment to a front portion of the vehicle and a conveyor mount is adapted for attachment to a support location between the intake end of the conveyor body and the axle, the support location being selected such that as the conveyor body moves down, the support location moves down. A front hitch member has an upper end releasably attachable to the conveyor mount, and has a lower end releasably attachable to the front vehicle mount, so as to bear against the support location as the conveyor body moves down, with the result that the intake end moves up. The apparatus is adjustable such that the conveyor and vehicle may be substantially aligned for travel.

In a second aspect the invention provides a portable conveyor attachable to a vehicle for transport thereof. The conveyor comprises a conveyor body supported on an elevating frame, the frame operable to move the conveyor body up and down. The conveyor body and frame are supported on an axle and wheels such that an intake end of the conveyor body normally rests on the ground as the conveyor body pivots up and down about the intake end thereof. A rear hitch member has an axle end releasably and pivotally attachable to the axle adjacent a wheel thereof and adapted at an opposite tow end thereof for releasable attachment to a vehicle hitch at a rear end of the vehicle. A front vehicle mount is adapted for attachment to a front portion of the vehicle. A front hitch member has an upper end releasably attached to the conveyor at a support location between the intake end of the conveyor body and the axle. The support location being selected such that as the conveyor body moves down, the support location moves down. A lower end of the front hitch member is releasably attachable to the front vehicle mount, so as to bear against the support location as the conveyor body moves down, with the result that the intake end moves up. The conveyor and vehicle are substantially aligned for travel.

The front and rear hitch members can be easily removed from one conveyor and used with the vehicle, and the front vehicle mount installed thereon, to move a different conveyor. The conveyor and axle mounts are inexpensive and may be left on each conveyor that is to be moved from time to time.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
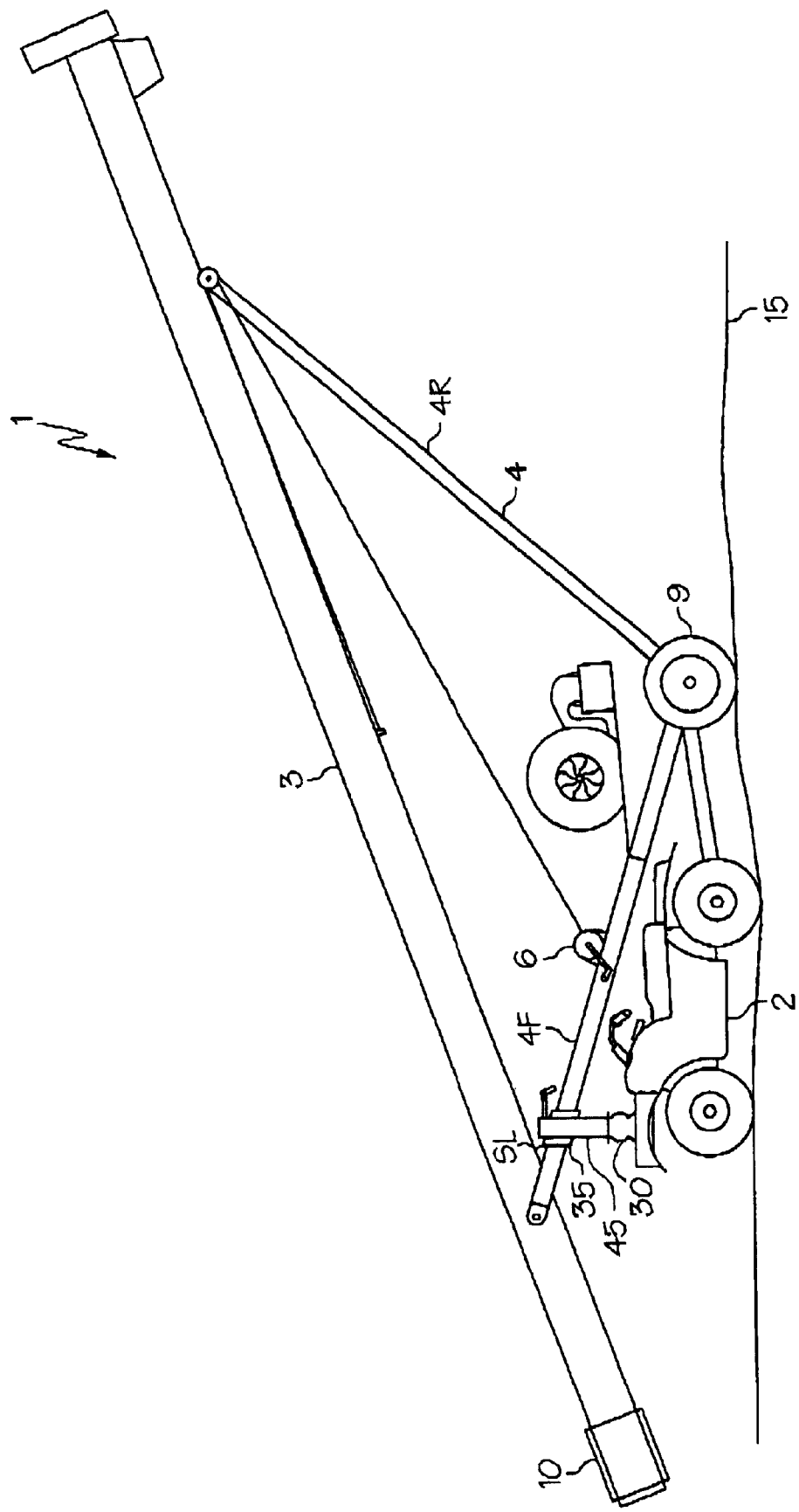
FIG. 1 is a side view of a conveyor embodying the invention.
Figure 2:
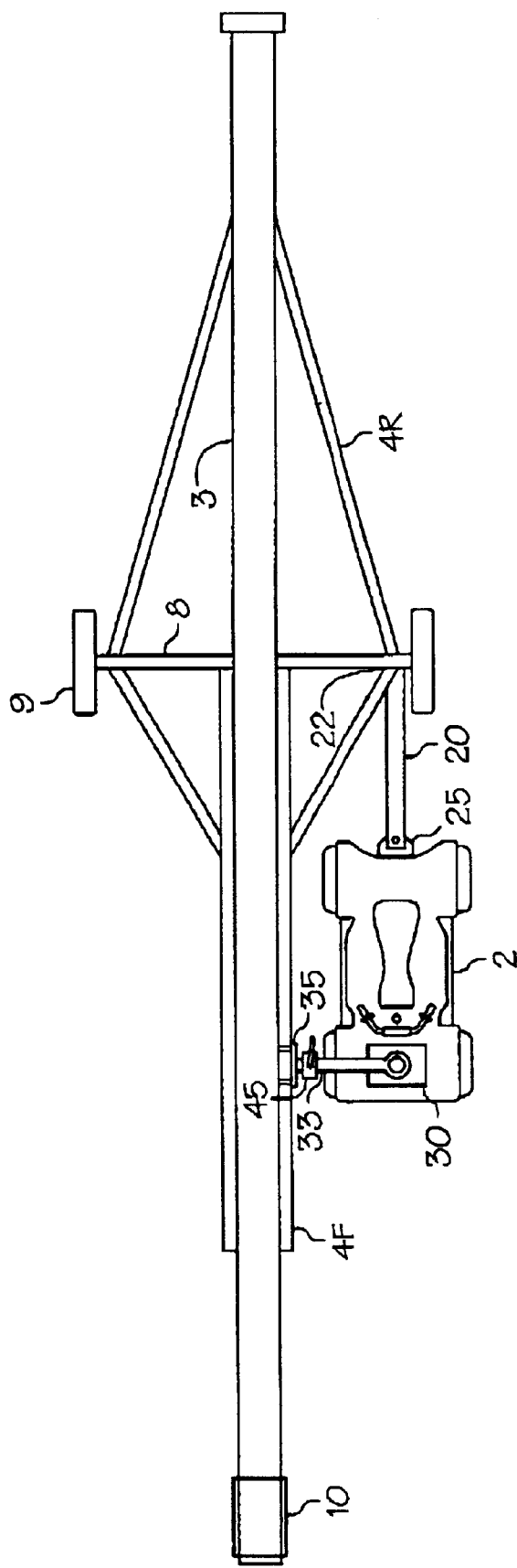
FIG. 2 is a top view of the conveyor of FIG. 1.

FIGS. 1 and 2 illustrate a portable conveyor 1 attached with an apparatus of the invention to a vehicle 2 for transport thereof. The illustrated vehicle 1 is an all terrain vehicle such as are common on farms, however other vehicles such as small tractors could be used as well. The apparatus conveniently comes in a kit form such that the required mounts can be left in place on the various conveyors to be moved, as well as on the vehicle, while the majority of the apparatus is quickly and easily moved from one conveyor to the next.

The conveyor 1 comprises a conveyor body 3 supported on an elevating frame 4 comprised of front and rear frame members 4F, 4R. The frame 4 is operable by cranking a winch 6 to move the conveyor body 3 up and down. The conveyor body 3 and frame 4 are supported on an axle 8 and wheels 9 such that an intake end 10 of the conveyor body 3 normally rests on the ground 15 as the conveyor body 3 pivots up and down about the intake end 10 thereof.

Figure 5:
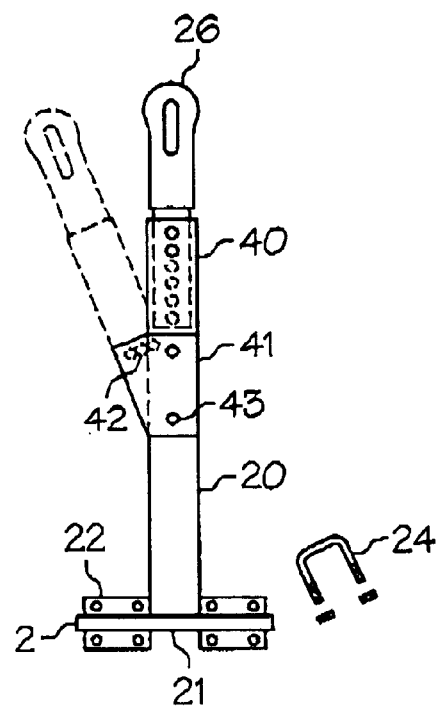
FIG. 5 is a top view of the rear hitch member and axle mount.

A rear hitch member 20 has an axle end 21 releasably and pivotally attachable to the axle 8 adjacent a wheel 9 thereof. As illustrated in FIG. 5, the rear hitch member 20 is attachable to the axle mount 22 by a pin 23. The axle mount 22 is attached to the axle 8 by U-bolts 24 or the like. The rear hitch member 20 can be quickly removed by removing the pin 23.

At the opposite tow end, the rear hitch member 20 is adapted for releasable attachment to a vehicle hitch 25 at a rear end of the vehicle 2 by a conventional trailer socket 26 attachable to a ball on the vehicle hitch 25. A pin and clevis hitch, or similar hitch could also serve the purpose.

Figure 4:
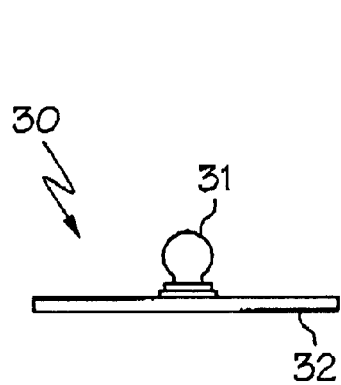
FIG. 4 is a side view of the front vehicle mount.

A front vehicle mount 30 is adapted for attachment to a front portion 31 of the vehicle 2. As illustrated in FIG. 4, the front vehicle mount 30 comprises a ball 31 attached to a plate 32 that acts to support the front hitch member 33 during transport. The plate 32 is conveniently attached to the front rack commonly found on all terrain vehicles, as seen in FIG. 1.

Figure 3:
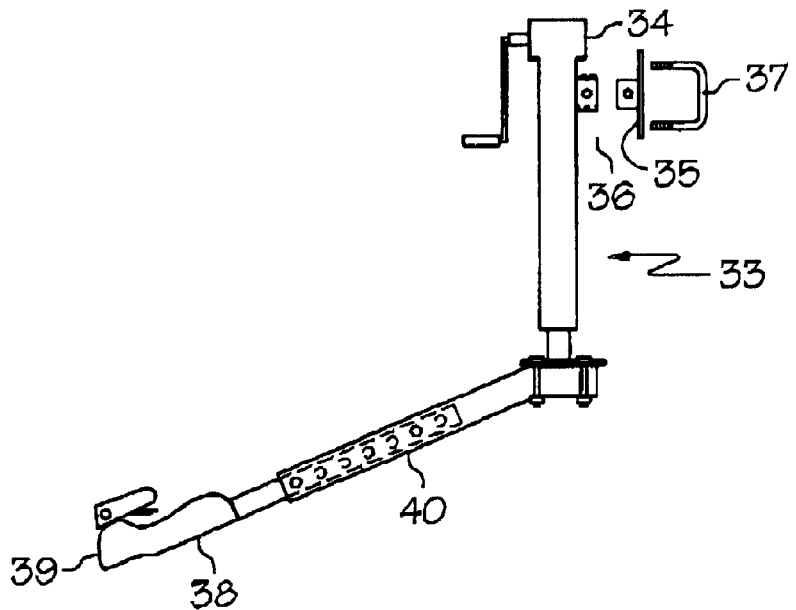
FIG. 3 is a rear view of the front hitch member and conveyor mount.

The front hitch member 33 is illustrated in FIG. 3 and has an upper end 34 releasably attached to the conveyor 1 at a support location SL between the intake end 10 of the conveyor body 3 and the axle 8. As illustrated in FIG. 33, the upper end 34 is attached to a conveyor mount 35 by a pin through corresponding holes 36 in the upper end 34 and conveyor mount 35. The conveyor mount 35 is attached to the front frame member 4F by a U-bolt 37 or the like.

The axle and conveyor mounts 22, 35 are inexpensive, such that they can be purchased for each conveyor to be moved, and then left on the conveyor so that the rest of the apparatus can be quickly moved from conveyor to conveyor.

A lower end 38 of the front hitch member 33 is releasably attachable to the front vehicle mount 30, so as to bear against the support location SL as the conveyor body 3 moves down, with the result that the intake end 10 moves up. As illustrated, the lower end 38 comprises a trailer socket 39 attachable to the ball 31 on the front vehicle mount 30.

The conveyor 1 and vehicle 2 are substantially aligned for travel, as illustrated in FIG. 2. To facilitate this alignment the front hitch member 33 is laterally extendable by incorporating a telescoping section 40. The illustrated rear hitch member 20 is also made laterally adjustable by incorporating an angle bracket 41 with a series of adjustment hole 42, and a pivot point 43 in the middle of the rear hitch member 20, as illustrated in FIG. 5 to facilitate alignment.

As seen in FIG. 3, the front hitch member 33 further comprises a jack 45 operable to increase a vertical distance between the upper and lower ends 34, 38 of the front hitch member 33. The jack 45 allows the operator to have the option of raising or lowering the intake end 10 by operating the jack 45 instead of the winch 6. A wider range of movement is provided as well.

To accommodate a wide range of vehicles, the rear hitch member 20 is also made extendable by adding a telescoping section 40 similar to that in the front hitch member 33. In addition, the lateral adjustments, along with the vertical adjustment provided by the jack 45, allow for the apparatus to accommodate a wide range of vehicles 2.

In operation, the vehicle 2 and front and rear hitch members 33, 20 are attached to the respective mounts as described above with the conveyor body 3 in an elevated position. Winch 6 is then operated to lower the conveyor body 3. As the conveyor body moves down, the support location SL is prevented from moving down with the result that the intake end 10 moves up allowing the vehicle 2 to move the conveyor 1 into a desired location. Alternatively, jack 45 may be used to raise the intake end 10 from the ground 15 to allow transport with the vehicle 2, or a combination of the jack 45 and winch 6. For added convenience, the winch 6 could be electric or otherwise powered.

The support location SL is selected such that as the conveyor body 3 moves down, the support location SL moves down. A convenient support location SL on the illustrated conveyor 1 is on the front frame member 4F. For other frame configurations a similar suitable location on either the frame 4 or conveyor body 3 will generally be available.

As is evident, the vehicle is located remote from the intake end 10 of the conveyor 1 so that the intake end 10 may be moved into position through a bin door, or under a bin or wherever is desired.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. For use with a conventional portable conveyor comprising a conveyor body supported on an elevating frame, the frame operable to move the conveyor body up and down, the conveyor body and frame supported on an axle with wheels such that an intake end of the conveyor body normally rests on the ground as the conveyor body pivots up and down about the intake end thereof, an apparatus in kit form for attachment of the conveyor to a vehicle, the apparatus comprising:

an axle mount adapted for attachment to the axle of the conveyor adjacent a wheel thereof;

a rear hitch member having an axle end releasably and pivotally attachable to the axle mount and adapted at an opposite tow end thereof for releasable attachment to a vehicle hitch at a rear end of the vehicle;

a front vehicle mount adapted for attachment to a front portion of the vehicle;

a conveyor mount adapted for attachment to a support location between the intake end of the conveyor body and the axle, the support location being selected such that as the conveyor body moves down, the support location moves down;

a front hitch member having an upper end releasably attachable to the conveyor mount, and having a lower end releasably attachable to the front vehicle mount, so as to bear against the support location as the conveyor body moves down, with the result that the intake end moves up; and wherein the apparatus is adjustable such that the conveyor and vehicle may be substantially aligned for travel.

2. The apparatus of claim 1 wherein the front hitch member further comprises a jack operable to increase a vertical distance between the upper and lower ends of the front hitch member.

3. The apparatus of claim 2 wherein the front hitch member is laterally extendable such that the conveyor and vehicle may be aligned for travel.

4. The apparatus of claim 3 wherein the rear hitch member is laterally adjustable such that the conveyor and vehicle may be aligned for travel.

5. The apparatus of claim 4 wherein the rear hitch member is extendable.

6. The apparatus of claim 1 wherein the front vehicle mount comprises a ball and wherein the lower end of the front hitch member comprises a socket.

7. The apparatus of claim 6 wherein the ball is mounted to a plate, and wherein the plate supports the front hitch member during transport.

8. The apparatus of claim 1 wherein the vehicle hitch comprises a ball and wherein the tow end of the rear hitch member comprises a socket.

9. A portable conveyor attachable to a vehicle for transport thereof, the conveyor comprising:

a conveyor body supported on an elevating frame, the frame operable to move the conveyor body up and down;

the conveyor body and frame supported on an axle and wheels such that an intake end of the conveyor body normally rests on the ground as the conveyor body pivots up and down about the intake end thereof;

a rear hitch member having an axle end releasably and pivotally attachable to the axle adjacent a wheel thereof and adapted at an opposite tow end thereof for releasable attachment to a vehicle hitch at a rear end of the vehicle;

a front vehicle mount adapted for attachment to a front portion of the vehicle;

a front hitch member having an upper end releasably attached to the conveyor at a support location between the intake end of the conveyor body and the axle, the support location being selected such that as the conveyor body moves down, the support location moves down, and having a lower end releasably attachable to the front vehicle mount, so as to bear against the support location as the conveyor body moves down, with the result that the intake end moves up; and wherein the conveyor and vehicle are substantially aligned for travel.

10. The apparatus of claim 9 wherein the front hitch member further comprises a jack operable to increase a vertical distance between the upper and lower ends of the front hitch member.

11. The apparatus of claim 10 wherein the front hitch member is laterally extendable such that the conveyor and vehicle may be aligned for travel.

12. The apparatus of claim 11 wherein the rear hitch member is laterally adjustable such that the conveyor and vehicle may be aligned for travel.

13. The apparatus of claim 12 wherein the rear hitch member is extendable.

14. The apparatus of claim 1 wherein the front vehicle mount comprises a ball and wherein the lower end of the front hitch member comprises a socket.

15. The apparatus of claim 14 wherein the ball is mounted to a plate, and wherein the plate supports the front hitch member during transport.

16. The apparatus of claim 15 wherein the vehicle hitch comprises a ball and wherein the tow end of the rear hitch member comprises a socket.

* * * * *